(12) United States Patent
Niemelä et al.

(10) Patent No.: US 10,616,548 B2
(45) Date of Patent: Apr. 7, 2020

(54) METHOD AND APPARATUS FOR PROCESSING VIDEO INFORMATION

(71) Applicant: Nokia Technologies Oy, Espoo (FI)

(72) Inventors: Marko Niemelä, Tampere (FI); Kim Gronholm, Helsinki (FI)

(73) Assignee: Nokia Technologies Oy, Espoo (FI)

( * ) Notice: Subject to any disclaimer, the term of this patent is extended or adjusted under 35 U.S.C. 154(b) by 44 days.

(21) Appl. No.: 16/072,460

(22) PCT Filed: Jan. 20, 2017

(86) PCT No.: PCT/FI2017/050029
§ 371 (c)(1),
(2) Date: Jul. 24, 2018

(87) PCT Pub. No.: WO2017/129858
PCT Pub. Date: Aug. 3, 2017

(65) Prior Publication Data
US 2019/0037200 A1    Jan. 31, 2019

(30) Foreign Application Priority Data
Jan. 29, 2016 (FI) ...................................... 20165059

(51) Int. Cl.
*H04N 13/122*  (2018.01)
*H04N 13/332*  (2018.01)
(Continued)

(52) U.S. Cl.
CPC ......... *H04N 13/122* (2018.05); *G06T 3/0031* (2013.01); *G06T 3/0093* (2013.01);
(Continued)

(58) Field of Classification Search
CPC .. H04N 13/122; H04N 13/332; H04N 13/117; H04N 5/23238; G06T 3/0031; G06T 3/0093
(Continued)

(56) References Cited

U.S. PATENT DOCUMENTS

2007/0035530 A1    2/2007  Van Geest et al.
2012/0200676 A1    8/2012  Huitema et al.
(Continued)

FOREIGN PATENT DOCUMENTS

EP            2605521 A1    6/2013
WO      2015/162946 A1    10/2015

OTHER PUBLICATIONS

Extended European Search Report received for corresponding European Patent Application No. 17743776.1, dated Aug. 1, 2019, 13 pages.
(Continued)

*Primary Examiner* — Patricia I Young
(74) *Attorney, Agent, or Firm* — Nokia Technologies Oy

(57) ABSTRACT

There are disclosed various methods, apparatuses and computer programs for processing video information. In an embodiment of the method a first video stream representing a left view of a part of a scene and a second video stream representing a right view of the part of the scene are received. Optical enhancement data regarding image pairs of the first video stream and the second video stream and transform data for warping at least one of the left view and the right view are obtained (514). The first video stream and the second video stream are warped (516-522) on the basis of the optical enhancement data and the transform data.

20 Claims, 7 Drawing Sheets

(51) Int. Cl.
| | |
|---|---|
| *H04N 13/117* | (2018.01) |
| *G06T 3/00* | (2006.01) |
| *H04N 5/232* | (2006.01) |
| *H04N 19/597* | (2014.01) |
| *G03B 35/08* | (2006.01) |
| *H04N 19/46* | (2014.01) |
| *G03B 37/04* | (2006.01) |
| *H04N 13/178* | (2018.01) |
| *H04N 13/161* | (2018.01) |
| *H04N 13/243* | (2018.01) |

(52) U.S. Cl.
CPC ....... *H04N 5/23238* (2013.01); *H04N 13/117* (2018.05); *H04N 13/332* (2018.05); *G03B 35/08* (2013.01); *G03B 37/04* (2013.01); *H04N 13/161* (2018.05); *H04N 13/178* (2018.05); *H04N 13/243* (2018.05); *H04N 19/46* (2014.11); *H04N 19/597* (2014.11)

(58) Field of Classification Search
USPC .......................................................... 348/36
See application file for complete search history.

(56) References Cited

U.S. PATENT DOCUMENTS

| | | |
|---|---|---|
| 2013/0050412 A1 | 2/2013 | Shinohara et al. |
| 2013/0057644 A1 | 3/2013 | Stefanoski et al. |
| 2013/0147931 A1 | 6/2013 | Ohba et al. |
| 2013/0187910 A1 | 7/2013 | Raymond et al. |
| 2014/0111627 A1 | 4/2014 | Ishigami |
| 2014/0118509 A1 | 5/2014 | Kroon |
| 2014/0347452 A1 | 11/2014 | Smolic et al. |

OTHER PUBLICATIONS

Office action received for corresponding Finnish Patent Application No. 20165059, dated May 26, 2016, 8 pages.

"Extrapolation", Wikipedia, Retrieved on May 1, 2018, Webpage available at: https://en.wikipedia.org/wiki/Extrapolation.

"Bilinear Interpolation", Wikipedia, Retrieved on May 1, 2018, Webpage available at: https://en.wikipedia.org/wiki/Bilinear_interpolation.

International Search Report and Written Opinion received for corresponding Patent Cooperation Treaty Application No. PCT/FI2017/050029, dated Apr. 21, 2017, 16 pages.

Extended European Search Report received for corresponding European Patent Application No. 17743776.1, dated Nov. 7, 2019, 14 pages.

Fig. 2a  Fig. 2b  Fig. 2c  Fig. 2d

METHOD AND APPARATUS FOR PROCESSING VIDEO INFORMATION

RELATED APPLICATION

This application was originally filed as Patent Cooperation Treaty Application No. T/FI2017/050029 filed Jan. 20, 2017 which claims priority benefit to Finnish Patent Application No. 20165059, filed Jan. 29, 2016.

TECHNICAL FIELD

The present invention relates to a method for processing video information, an apparatus for processing video information, and computer program for processing video information.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

A head mounted display (HMD) is a display device, worn on the head that has a small display optic in front of the eyes. One use case for the head mounted display is ability to watch live of pre-recorded videos. Compared to traditional videos, when watching a 360 degree panoramic video with a head mounted display a user may be able to feel much more immersed inside the world of the video. Optional stereo effect in the video may enhance the immersive feeling even further.

A parallax can be regarded as a displacement or difference in the apparent position of an object when it is viewed along two different lines of sight. The parallax may be measured by the angle or semi-angle of inclination between those two lines. Parallax motion effect can be regarded as an apparent motion which objects may seem to take when an observer moves, or the observer rotates her/his head. For example, objects which are closer to the observer may seem to move faster than objects which are farther away from the observer.

360 degree stereo panorama videos are currently a common way to distribute three-dimensional (3D) videos meant to be viewed in head mounted displays. Viewing these videos may be an immersive experience, but even small glitches or shortcomings in the video playback may reduce the feeling of "presence" and may give the video artificial look. One such known issue in the 360 degree stereo panorama video format is the lack of the parallax motion effect when viewer rotates his/her head. This effect may be missing because the video streams for both eyes may be prestitched so that each object in the scene is seen from a fixed viewpoint. In real life when head is rotated the viewpoint moves slightly along the head and the foreground objects appear to move in relation to the background objects.

Currently, when 360 degree stereo panorama video is viewed in head mounted display, there is no perceived parallax motion effect. In addition to stereo panoramas there are other known techniques to render stereographic video to head mounted display such as full three dimensional reconstruction of the scene with the help of additional depth data. That kind of rendering techniques may also enable the parallax motion effect, but these techniques may be rather complex to implement and may have other problems such as sensitivity to depth data errors.

SUMMARY

Various embodiments provide a method and apparatus for. In accordance with an embodiment, there is provided a method for processing video information.

Various aspects of examples of the invention are provided in the detailed description.

According to a first aspect, there is provided a method comprising:
receiving a first video stream representing a left view of a part of a scene;
receiving a second video stream representing a right view of the part of the scene;
obtaining optical enhancement data regarding image pairs of the first video stream and the second video stream;
obtaining transform data for warping at least one of the left view and the right view; and
warping the first video stream and the second video stream on the basis of the optical enhancement data and the transform data;
the warping comprising:
interpolating a first part of the left view on the basis of interpolation values of the transform data and the optical enhancement data;
extrapolating a second part of the left view on the basis of extrapolation values of the transform data and the optical enhancement data;
interpolating a first part of the right view on the basis of interpolation values of the transform data and the optical enhancement data;
extrapolating a second part of the right view on the basis of extrapolation values of the transform data and the optical enhancement data.

According to a second aspect, there is provided an apparatus comprising at least one processor; and at least one memory including computer program code the at least one memory and the computer program code configured to, with the at least one processor, cause the apparatus to perform at least the following:
receive a first video stream representing a left view of a part of a scene;
receive a second video stream representing a right view of the part of the scene;
obtain optical enhancement data regarding image pairs of the first video stream and the second video stream;
obtain transform data for warping at least one of the left view and the right view; and
warp the first video stream and the second video stream on the basis of the optical enhancement data and the transform data;
the apparatus further comprising computer program code configured to, with the at least one processor, cause the apparatus to perform the warping by:
interpolating a first part of the left view on the basis of interpolation values of the transform data and the optical enhancement data;
extrapolating a second part of the left view on the basis of extrapolation values of the transform data and the optical enhancement data;
interpolating a first part of the right view on the basis of interpolation values of the transform data and the optical enhancement data;

extrapolating a second part of the right view on the basis of extrapolation values of the transform data and the optical enhancement data.

According to a third aspect, there is provided an apparatus comprising:

means for receiving a first video stream representing a left view of a part of a scene;

means for receiving a second video stream representing a right view of the part of the scene;

means for obtaining optical enhancement data regarding image pairs of the first video stream and the second video stream;

means for obtaining transform data for warping at least one of the left view and the right view; and means for warping the first video stream and the second video stream on the basis of the optical enhancement data and the transform data;

the transform data comprising:
interpolation values for a first part of the left view;
extrapolation values for a second part of the left view;
interpolation values for a first part of the right view;
extrapolation values for a second part of the right view.

According to a fourth aspect, there is provided a computer readable storage medium stored with code thereon for use by an apparatus, which when executed by a processor, causes the apparatus to perform:

receive a first video stream representing a left view of a part of a scene;

receive a second video stream representing a right view of the part of the scene;

obtain optical enhancement data regarding image pairs of the first video stream and the second video stream;

obtain transform data for warping at least one of the left view and the right view; and warp the first video stream and the second video stream on the basis of the optical enhancement data and the transform data;

the transform data comprising:
interpolation values for a first part of the left view;
extrapolation values for a second part of the left view;
interpolation values for a first part of the right view;
extrapolation values for a second part of the right view.

According to a fifth aspect, there is provided a method comprising:

receiving a first video stream representing a left view of a part of a scene;

receiving a second video stream representing a right view of the part of the scene;

using information regarding image pairs of the first video stream and the second video stream to form optical enhancement data; and forming transform data for warping at least one of the left view and the right view on the basis of at least the optical enhancement data;

the transform data comprising:
interpolation values for a first part of the left view;
extrapolation values for a second part of the left view;
interpolation values for a first part of the right view;
extrapolation values for a second part of the right view.

According to a sixth aspect, there is provided an apparatus comprising at least one processor and at least one memory including computer program code the at least one memory and the computer program code configured to, with the at least one processor, cause the apparatus to perform at least the following:

receive a first video stream representing a left view of a part of a scene;

receive a second video stream representing a right view of the part of the scene;

use information regarding image pairs of the first video stream and the second video stream to form optical enhancement data; and form transform data for warping at least one of the left view and the right view on the basis of at least the optical enhancement data;

the transform data comprising:
interpolation values for a first part of the left view;
extrapolation values for a second part of the left view;
interpolation values for a first part of the right view;
extrapolation values for a second part of the right view.

According to a seventh aspect, there is provided an apparatus comprising:

means for receiving a first video stream representing a left view of a part of a scene;

means for receiving a second video stream representing a right view of the part of the scene;

means for using information regarding image pairs of the first video stream and the second video stream to form optical enhancement data; and means for forming transform data for warping at least one of the left view and the right view on the basis of at least the optical enhancement data;

the transform data comprising:
interpolation values for a first part of the left view;
extrapolation values for a second part of the left view;
interpolation values for a first part of the right view;
extrapolation values for a second part of the right view.

According to an eight aspect, there is provided a computer readable storage medium stored with code thereon for use by an apparatus, which when executed by a processor, causes the apparatus to perform:

receive a first video stream representing a left view of a part of a scene;

receive a second video stream representing a right view of the part of the scene;

use information regarding image pairs of the first video stream and the second video stream to form optical enhancement data; and form transform data for warping at least one of the left view and the right view on the basis of at least the optical enhancement data;

the transform data comprising:
interpolation values for a first part of the left view;
extrapolation values for a second part of the left view;
interpolation values for a first part of the right view;
extrapolation values for a second part of the right view.

BRIEF DESCRIPTION OF THE DRAWINGS

For a more complete understanding of example embodiments of the present invention, reference is now made to the following descriptions taken in connection with the accompanying drawings in which:

FIG. 2a illustrates an example of a left image displayed by a head mounted display, in accordance with an embodiment;

FIG. 2b illustrates an example of a right image displayed by the head mounted display, in accordance with an embodiment;

FIG. 2c illustrates an example of optical flow map displacement vectors for a left eye formed on the basis of FIGS. 2a and 2b, in accordance with an embodiment;

FIG. 2d illustrates an example of optical flow map displacement vectors for a right eye formed on the basis of FIGS. 2a and 2b, in accordance with an embodiment;

DETAILED DESCRIPTION OF SOME EXAMPLE EMBODIMENTS

The following embodiments are exemplary. Although the specification may refer to "an", "one", or "some" embodiment(s) in several locations, this does not necessarily mean that each such reference is to the same embodiment(s), or that the feature only applies to a single embodiment. Single features of different embodiments may also be combined to provide other embodiments.

When 360 degree stereo panorama video is viewed in a head mounted display with a video player software, a video player may be able to create similar parallax motion effect which is present in real world, but not in traditional 360 degree stereo panoramas. The parallax motion may make the video more realistic looking as the objects in the foreground appear to move slightly in relation to background objects when the head is rotated. This parallax motion effect may be achieved by embedding optical enhancement data from stereo images into the video stream and at the playback time slightly warping left and right eye images according to the viewport and optical enhancement data. In accordance with an embodiment, the warping may be done so that the video quality or stereo effect does not degrade at all in the middle of the viewport, which is the area that may be critical for the perceived video quality. Instead the video quality and stereo effect may get degraded gradually towards the edges of the viewport, but human stereo vision ability is naturally already reduced in that direction. Secondly, in most of the head mounted display devices that are currently available vision gets blurrier towards the viewport edges because of the optics design of head mounted displays, this may hide some video quality degradation in those areas.

The optical enhancement data may be based on, for example, optical flow data and/or additional panoramas and/or extra pixels for obscured content and/or depth map (s). In the following, the use of optical flow data is explained in more detail but it should be noted that one or more of the above mentioned alternatives or another additional data may be used. Furthermore, although the following description may use a 360 degrees panorama video as an example of panorama video, same principles may also be applicable in connection with other kinds of projections, such as cube mapping, in which environment may be mapped using six faces of a cube as a map shape.

Figure 1B:
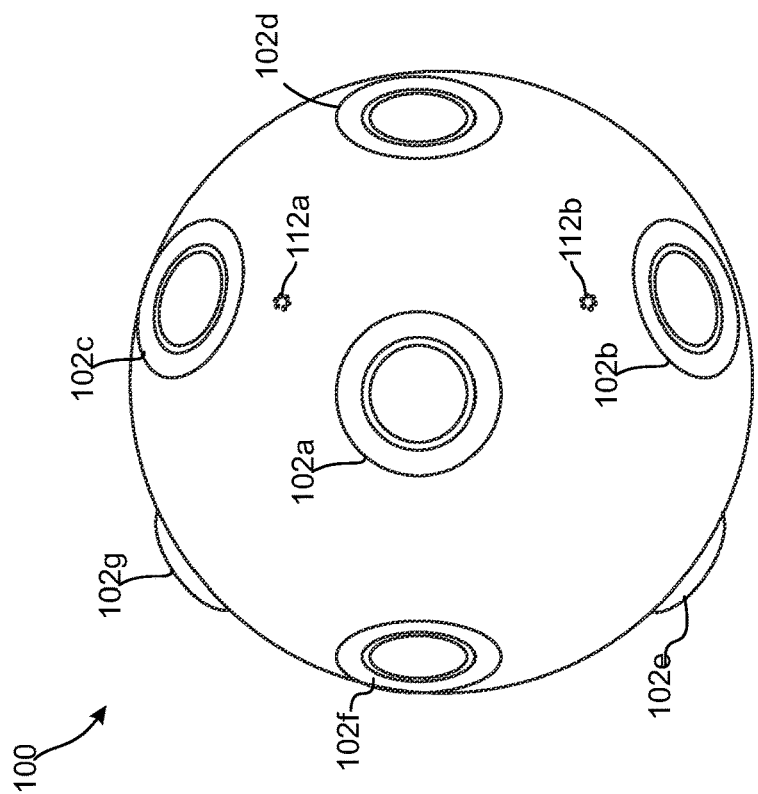
FIG. 1b shows a perspective view of a multi-camera system, in accordance with an embodiment.
Figure 1A:
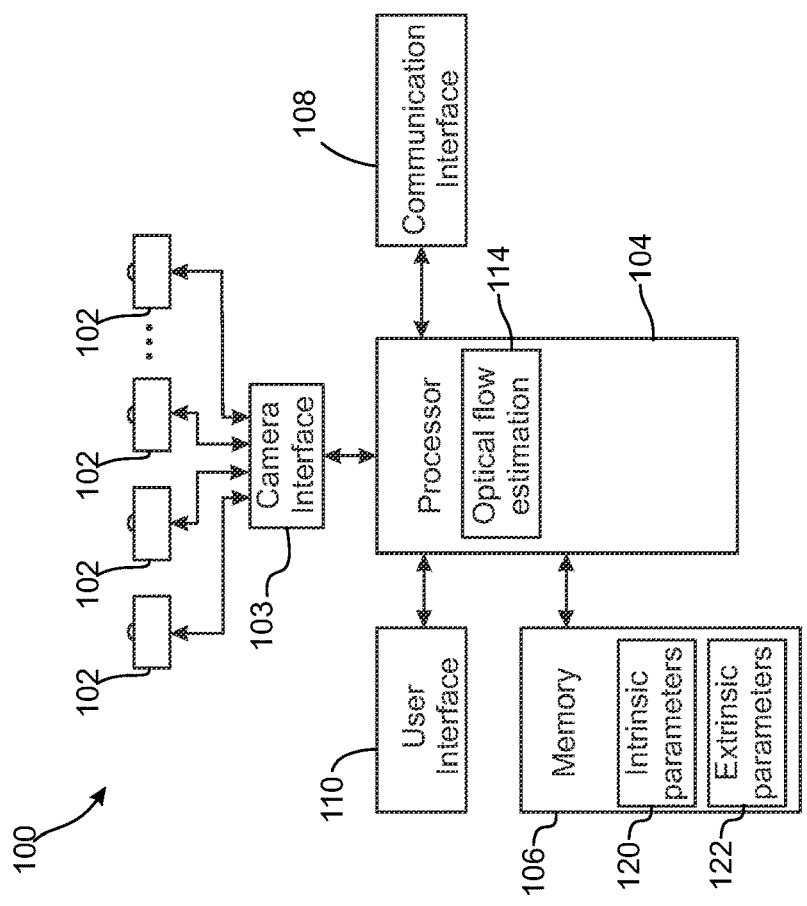
FIG. 1a shows an example of a multi-camera system as a simplified block diagram, in accordance with an embodiment.

FIG. 1a illustrates an example of a multi-camera system 100, which may be able to capture and produce 360 degree stereo panorama video. The multi-camera system 100 comprises two or more camera units 102. In this example the number of camera units 102 is eight, but may also be less than eight or more than eight. Each camera unit 102 is located at a different location in the multi-camera system and may have a different orientation with respect to other camera units 102 so that they may capture a part of the 360 degree scene from different viewpoints substantially simultaneously. A pair of camera units 102 of the multi-camera system 100 may correspond with left and right eye viewpoints at a time. As an example, the camera units 102 may have an omnidirectional constellation so that it has a 360° viewing angle in a 3D-space. In other words, such multi-camera system 100 may be able to see each direction of a scene so that each spot of the scene around the multi-camera system 100 can be viewed by at least one camera unit 102 or a pair of camera units 102.

Without losing generality, any two camera units 102 of the multi-camera system 100 may be regarded as a pair of camera units 102. Hence, a multi-camera system of two cameras has only one pair of camera units, a multi-camera system of three cameras has three pairs of camera units, a multi-camera system of four cameras has six pairs of camera units, etc. Generally, a multi-camera system 100 comprising N camera units 102, where N is an integer greater than one, has $N(N-1)/2$ pairs of camera units 102. Accordingly, images captured by the camera units 102 at a certain time may be considered as $N(N-1)/2$ pairs of captured images.

The multi-camera system 100 of FIG. 1a may also comprise a processor 104 for controlling the operations of the multi-camera system 100. The camera units 102 may be connected, for example, via a camera interface 103 to the processor 104. There may also be a memory 106 for storing data and computer code to be executed by the processor 104, and a transceiver 108 for communicating with, for example, a communication network and/or other devices in a wireless and/or wired manner. The user device 100 may further comprise a user interface (UI) 110 for displaying information to the user, for generating audible signals and/or for receiving user input. However, the multi-camera system 100 does not need to comprise each feature mentioned above, or may comprise other features as well. For example, there may be electric and/or mechanical elements for adjusting and/or controlling optics of the camera units 102 (not shown).

FIG. 1a also illustrates some operational elements which may be implemented, for example, as a computer code in the software of the processor, in hardware, or both. An optical flow estimation element 114 may perform optical flow estimation to pair of images of different camera units 102. The transform vectors or other information indicative of the amount of interpolation/extrapolation to be applied to different parts of a viewport may have been stored into a memory or they may be calculated e.g. as a function of the location of a pixel in question. It should be noted here that the transform vector does not need to be defined for each pixel of a viewport but may be defined, for example, so that for pixels on the same horizontal location but in different vertical location the same interpolation/extrapolation factor may be used. This can be seen e.g. from FIG. 3, which illustrates some transform vectors. The length of the transform vectors change in the horizontal direction but remains substantially the same in the vertical direction. However, in accordance with an embodiment, the length of the transform vectors may change in the vertical direction, or both in vertical and horizontal direction. As a further note, the term transform vector is also used to describe the strength of extrapolation when pixels are not interpolated but extrapolated.

The multi-camera system 100 may also comprise intrinsic parameters 120 and extrinsic parameters 122 for camera units 102. The parameters may be stored, for example, in the memory 106.

The operation of the elements will be described later in more detail. It should be noted that there may also be other operational elements in the multi-camera system 100 than those depicted in FIG. 1a.

FIG. 1b shows as a perspective view an example of an apparatus comprising the multi-camera system 100. In FIG. 1b seven camera units 102a-102g can be seen, but the multi-camera system 100 may comprise even more camera units which are not visible from this perspective. FIG. 1b also shows two microphones 112a, 112b, but the apparatus may also comprise one or more than two microphones.

In accordance with an embodiment, the multi-camera system 100 may be controlled by another device (not shown), wherein the multi-camera system 100 and the other device may communicate with each other and a user may use a user interface of the other device for entering commands, parameters, etc. and the user may be provided information from the multi-camera system 100 via the user interface of the other device.

Some terminology regarding the multi-camera system 100 will now be shortly described. A viewport is a part of the scene which is displayed by a head mounted display at a time. Both left and right eye images may have overlapping, but slightly different viewports. A camera space, or camera coordinates, stands for a coordinate system of an individual camera unit 102 whereas a world space, or world coordinates, stands for a coordinate system of the multi-camera system 100 as a whole. An optical flow may be used to describe how objects, surfaces, and edges in a visual scene move or transform, when an observing point moves between from a location of one camera to a location of another camera. In fact, there does not need to be any actual movement but it may virtually be determined how the view of the scene might change when a viewing point is moved from one camera unit to another camera unit. A parallax can be regarded as a displacement or difference in the apparent position of an object when it is viewed along two different lines of sight. The parallax may be measured by the angle or semi-angle of inclination between those two lines. Parallax motion effect can be regarded as an apparent motion which objects may seem to take when an observer moves, or the observer rotates her/his head.

A depth map may be used to describe the location of objects in a depth direction of the scene. Such a depth map may then be used to determine how the view of the scene might change when a viewing point is moved from one camera unit to another camera unit. Furthermore, as was already mentioned, optical flow and/or depth map data are not the only possibilities to provide optical enhancement data for producing parallax motion effect.

Figure 1C:
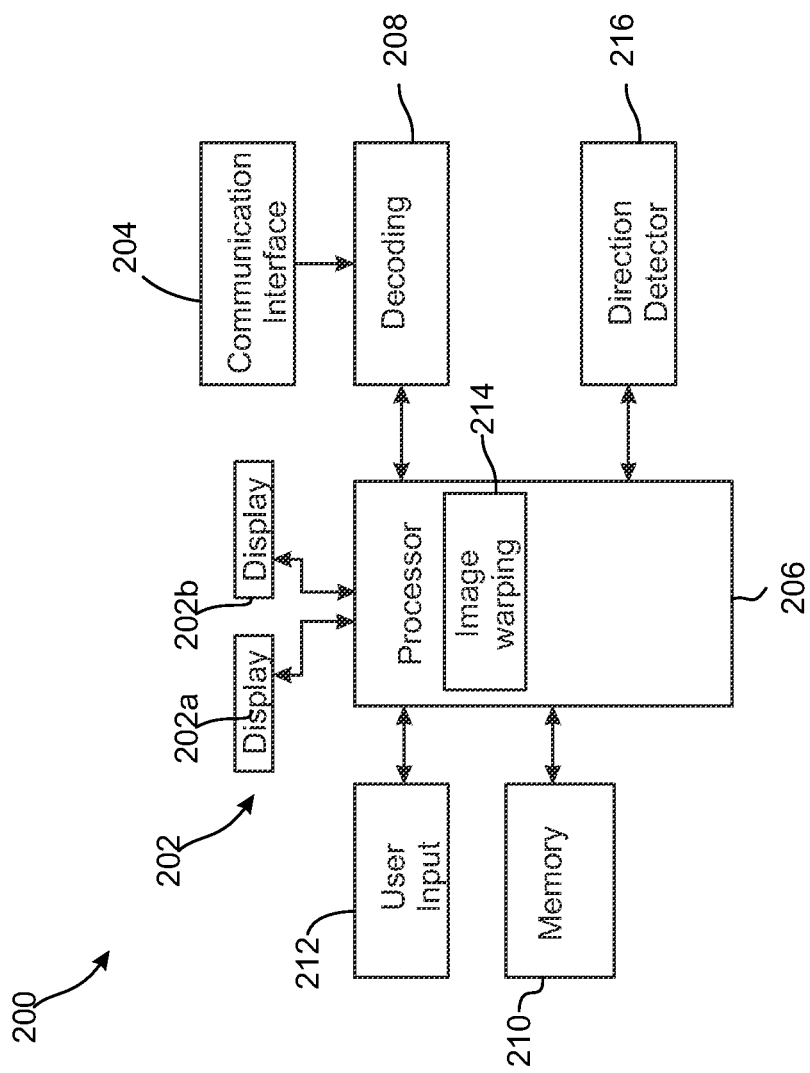
FIG. 1c shows an example of a video playback apparatus as a simplified block diagram, in accordance with an embodiment.

FIG. 1c illustrates an example of a video playback apparatus 200, such as a head mounted display. The video playback apparatus 200 may comprise, for example, one or two displays 202 for video playback. When two displays are used a first display 202a may display images for a left eye and a second display 202b may display images for a right eye, in accordance with an embodiment. In case of only one display 202, that display 202 may be used to display images for the left eye on the left side of the display 202 and to display images for the right eye on the right side of the display 202. The video playback apparatus 200 may be provided with encoded data streams via a communication interface 204 and a processor 206 may perform control operations for the video playback apparatus 200 and may also perform operations to reconstruct video streams for displaying on the basis of received encoded data streams. The video playback apparatus 200 may further comprise a processor 206 for reconstructing video streams for displaying on the basis of received encoded data streams. There may also be a decoding element 208 for decoding received data streams and a memory 210 for storing data and computer code, and an input element 212 for receiving e.g. user instructions. The video playback apparatus 200 may further comprise a direction detector 216 to detect the direction where the video playback apparatus 200 is pointed at. This direction may then be used to determine the part of a scene the user of the video playback apparatus 200 is looking at. The direction detector 216 may comprise, for example, an electronic compass, a gyroscope and/or an accelerometer.

The video playback device 200 may comprise a warping element 214 which may perform image warping on the basis of optical enhancement information received e.g. from an encoding device, from a file or from another source, and transform vectors as will be described later in this specification.

It should be noted that the video playback device 200 does not need to comprise each of the above elements or may also comprise other elements. For example, the decoding element 208 may be a separate device wherein that device may perform decoding operations and provide decoded data stream to the video playback device 200 for further processing and displaying decoded video streams.

Figure 5:
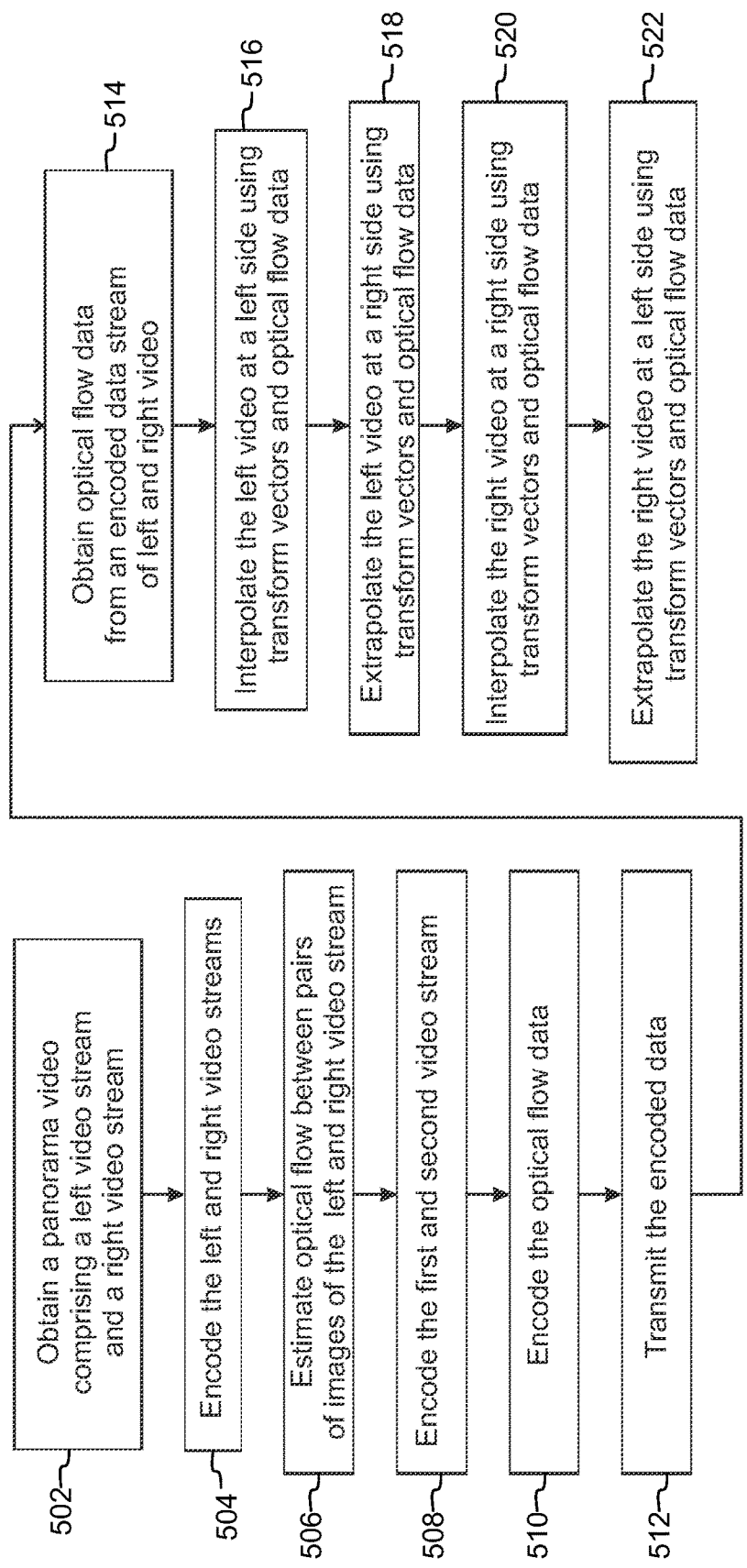
FIG. 5 shows a flowchart of a method of image warping, in accordance with an embodiment.

In the following, optical flow acquisition is described in more detail with reference to the flow diagram of FIG. 5, in accordance with an embodiment. Video information to be processed may have been captured and processed by two or more camera units 102 to obtain a panorama video, for example a 360 degree panorama video (block 502). From this panorama video, a first stream of images (frames) representing e.g. left eye views and a second stream of images representing e.g. right eye views of the scene may be encoded 504. On the basis of images of the first stream and images of the second stream optical flow between left and right eye images may be acquired 506. For example, an optical flow estimation element 114 may perform optical flow estimation to the pair of images of different camera units 102 i.e. using one image of the first stream and one image of the second stream to find out corresponding objects in both video streams and to determine differences in locations of these objects in the first stream and in the second stream. These images of the pair of images may be such that they have been captured at the substantially same moment but they may also be captured at slightly different moments of time. The pair of images may then be processed by the optical flow estimation element 114 with an optical flow estimation algorithm, for example, with some dense optical flow estimation algorithm. The algorithm may hence analyze the video one pair of images at a time or in case of computer generated videos it may be calculated from a scene 3D geometry.

This may be done, for example, by registering both images in the same coordinate system based on input extrinsic parameters of the camera units 102. The coordinate system may be the coordinate system of one of the camera units 102. Then, one or more locations may be selected in one image of the pair of images and a search may be performed for finding a corresponding location in the other image of the pair of images. This search may be performed so that image information of different locations of the other image is compared with the image information of the selected location and when a best match has been found, this location may be selected to represent the same location. In practice, input extrinsic camera parameters and the coordinates of the selected location in the one image may be used to estimate where the corresponding location in the other image may be located. Then a small neighborhood of the corresponding location in the other image may be searched and the image content examined by evaluating an image similarity metric (such as mean square error) at each searched location, and choosing the location that minimizes the error or maximizes similarity. This process may output one or more 2D optical flow vectors in the coordinate system of the camera unit in question.

Having the 2D optical flow vectors and possibly intrinsic and extrinsic transformation of each camera unit 102, the 2D optical flow vectors may be mapped from the camera space to corresponding 3D rotations in a coordinate system centric to the entire imaging system, in other words, to a world space.

The resulting optical flow can be due to two components: parallax, resulting from the different viewpoints between the two camera units 102; and possible errors resulting from possibly incorrect camera extrinsic parameters. Such error(s) may exist in any direction, while a parallax effect may only occur in the direction of the line connecting the two cameras, i.e. the epipolar line. Using this information, a 3D rotation that is not about the epipolar line can be discarded.

When the optical flow data has been obtained, the first stream of images and the second stream of images may be encoded 508. Furthermore, the optical flow data (forward & backward) between left and right eye images may also be embedded into the encoded video stream 510 e.g. as a separate data stream. The encoded video and optical flow data may be transmitted 512 to a receiver, to a server or to another unit, and/or stored into a file.

Figure 3:
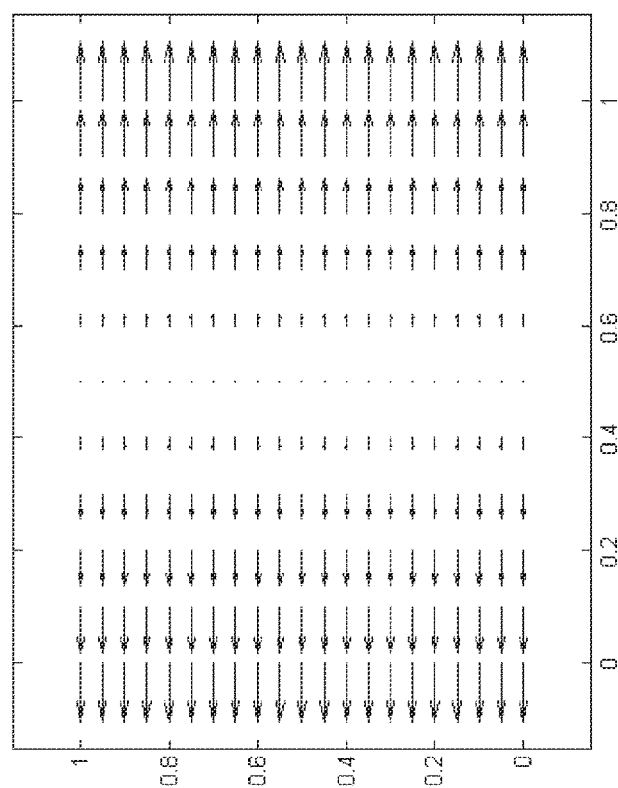
FIG. 3 illustrates some examples of transform vector values in a viewport, in accordance with an embodiment.

FIG. 2*a* illustrates an example of a left image displayed by a head mounted display and FIG. 2*b* illustrates an example of a right image displayed by a head mounted display. FIG. 2*c* illustrates an example of optical flow map displacement vectors for the left eye formed on the basis of FIGS. 2*a* and 2*b*, and, respectively, FIG. 2*d* illustrates an example of optical flow map displacement vectors for the right eye formed on the basis of FIGS. 2*a* and 2*b*. Darker areas in the images illustrate larger displacement values than lighter areas. FIG. 3 illustrates some examples of transform vector values in the viewport. In this example, near the middle area of the viewport values are minimal, and at the edges they get larger.

Figure 4A:
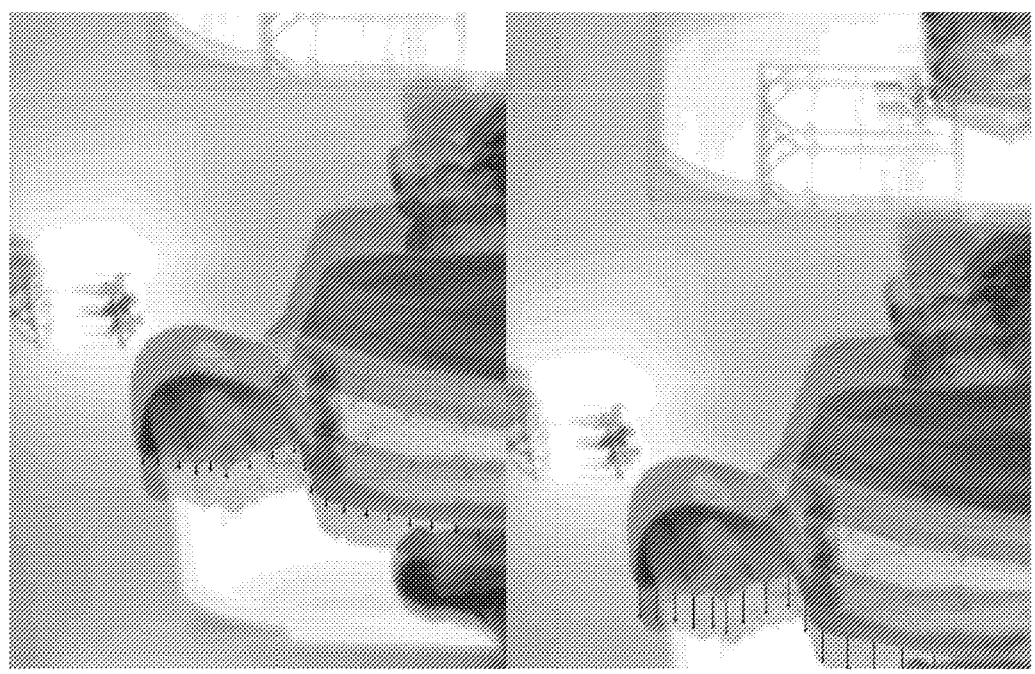
FIG. 4a illustrates some examples of pixel warping vectors for the left eye, in accordance with an embodiment.

FIG. 4*a* illustrates some examples of pixel warping vectors for the left eye. Pixels which are not far away from the center of the viewport, vector lengths are relatively small whereas in the example shown in FIG. 4*b* pixel warping vectors for the left eye near the edge of the viewport are longer than in the middle of the viewport.

Figure 4B:
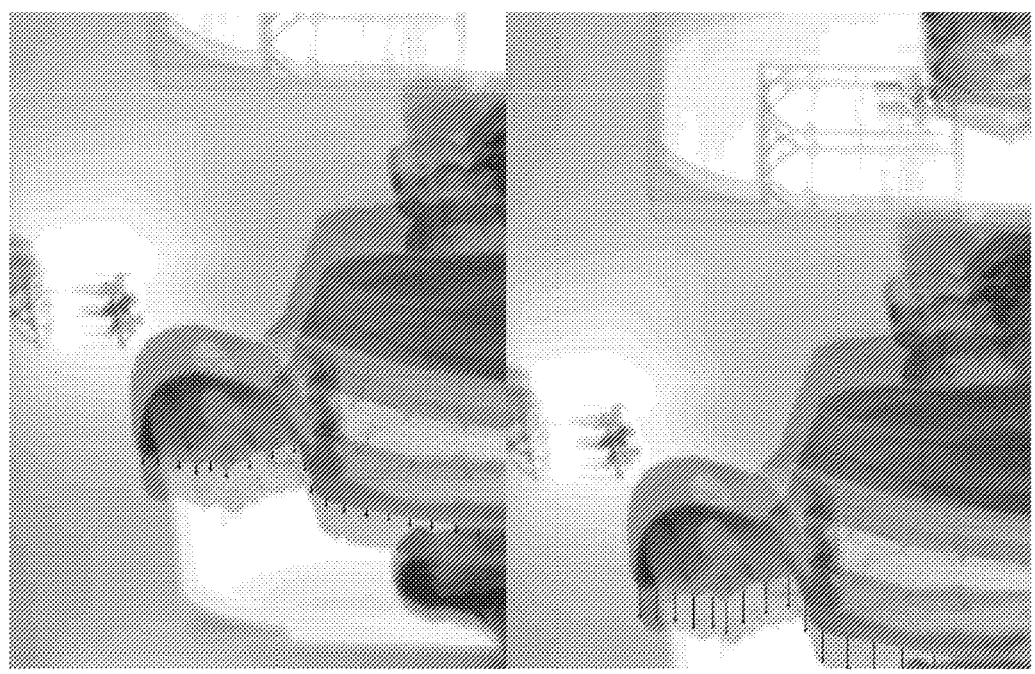
FIG. 4b illustrates some examples of pixel warping vectors for the left eye from a viewpoint different from FIG. 4a, in accordance with an embodiment.

FIG. 4*b* illustrates similar kind of example than FIG. 4*a* but in this Figure the viewport has changed to the right from the viewport of FIG. 4*a*. Hence, the person which stood near the middle of the image of FIG. 4*a* is now seen nearer the left edge of the image in FIG. 4*b* and hence pixel warping vectors for the left eye are longer for the same object (the person). The change of the viewport may have occurred because the user of the head mounted display has turned his/her head to the right.

The encoded video and optical flow data may be provided to a video decoder such as the video playback device 200 of FIG. 1*c* for decoding and video reconstruction. Decoding of the optical flow data at a playback time may not be needed i.e. it is optional. For example, a video player software may choose not to decode and use the optical flow data, wherein the video may be played back normally, but without parallax motion effect. If video stream is decoded fully, additionally optical flow maps are decoded from their own stream and passed to a playback code block in the video player software.

In the following, video playback for a head mounted display is described in more detail with reference to the flow diagram of FIG. 5 again, in accordance with an embodiment. Video playback for the head mounted display may happen otherwise normally as any other 360 degrees stereo panorama formats, but before passing the left and right eye images to the head mounted display, geometry distortion, a slight image warping may be applied to both left and right eye images for the pixels that are currently visible in a viewport of the head mounted display.

In the reconstruction and warping the video data, the parallax motion effect may be utilized on the basis of the optical flow data. This may include left and right eye viewport image warping as follows, in accordance with an embodiment.

To be able to determine the direction where the user of the video playback apparatus 200 is looking at, information on the direction may be obtained by the video playback apparatus 200 by the direction detector 216. The direction information may define the viewport i.e. the view of the panorama video which the video playback apparatus 200 would display.

Optical flow data may be obtained from a file, from an encoded data stream or from another source (block 514). Warping may be done for the viewport's left eye at the left side of the viewport pixels, for example pixels of the left side of FIG. 2*a*, so that pixel values are smoothly interpolated 516 according to interpolation values and optical flow data towards the right eye image pixels. As an example the warping element 116 may use transform vectors and optical flow data associated with a location of a pixel to define where that pixel should be moved in the viewport and how to fill the pixel values between the original location and the new location. Pixels with a larger optical flow displacement values may get warped more than pixels with small optical flow displacement values if interpolation values are the same.

The right side of the left eye viewport may need to be extrapolated 518 instead of the interpolation and its direction is towards the right edge of the viewport, but otherwise the warping may be done in the same way as the warping of the left side.

The image for the right eye may be formed in the same way as the image for the left eye, but in an inverted way. The right side of the viewport may now be interpolated 520 towards the left eye image and the left side of the viewport may need to be extrapolated 522.

When viewport is horizontally shifted (e.g. when the user rotates his/her head) the interpolation values for the image content may smoothly change as the content moves into another position of the viewport. This interpolation value change may cause the parallax motion effect. Interpolation value differences due to the change in the viewport are illustrated in FIGS. 4a and 4b.

Parallax motion effect combined to the 360 degrees stereo panorama video playback may enhance the 3D effect and may make the scene more realistic looking when viewed with the head mounted display, when the method described above is used.

The original 360 degree stereo video panorama data does not need to be altered. Hence, it can still be played back with a playback apparatus that does not have support for adding the parallax motion effect.

It should be noted that the location in which interpolation changes to extrapolation and vice versa does not need to be in the centre part of the viewport, but may be aside it. For example, the warping may be implemented so that interpolation is used for a larger area of the viewport than extrapolation.

In accordance with an embodiment, the optical flow data and the warping may be performed by the encoding apparatus, wherein the video playback apparatus 200 does not need to perform the warping but may decode received data and display it as such.

In accordance with another embodiment the optical flow data and the warping may be performed by the video playback apparatus 200 wherein the encoder may not need to obtain the optical flow data.

Figure 7:
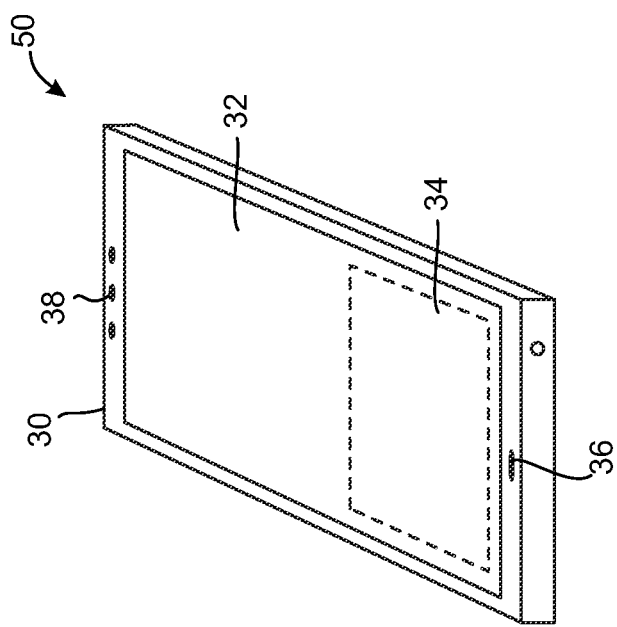
FIG. 7 shows an apparatus according to an example embodiment.
Figure 6:
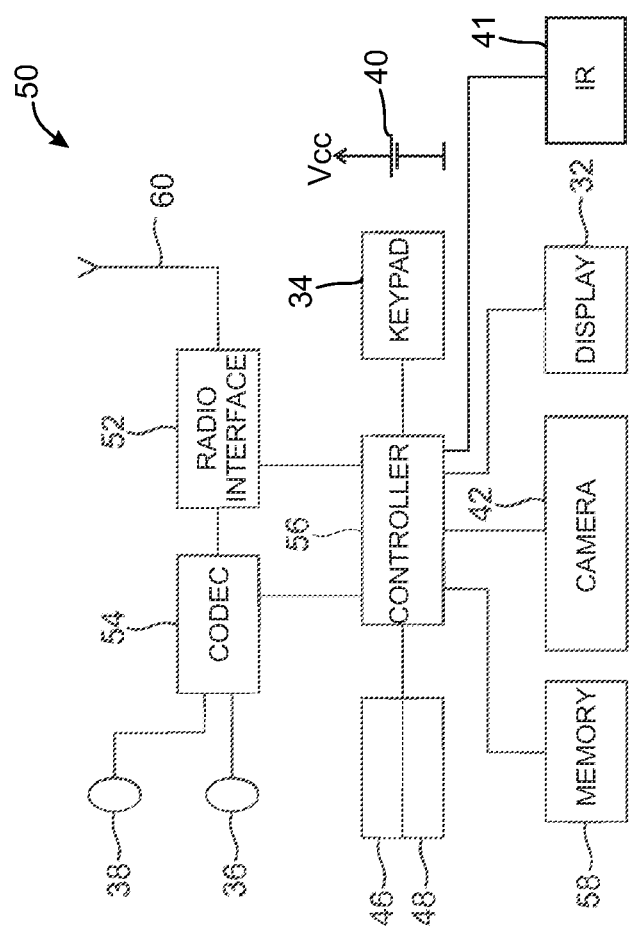
FIG. 6 shows a schematic block diagram of an exemplary apparatus or electronic device, in accordance with an embodiment.

The following describes in further detail suitable apparatus and possible mechanisms for implementing the embodiments of the invention. In this regard reference is first made to FIG. 6 which shows a schematic block diagram of an exemplary apparatus or electronic device 50 depicted in FIG. 7, which may incorporate a transmitter according to an embodiment of the invention.

The electronic device 50 may for example be a mobile terminal or user equipment of a wireless communication system. However, it would be appreciated that embodiments of the invention may be implemented within any electronic device or apparatus which may require transmission of radio frequency signals.

The apparatus 50 may comprise a housing 30 for incorporating and protecting the device. The apparatus 50 further may comprise a display 32 in the form of a liquid crystal display. In other embodiments of the invention the display may be any suitable display technology suitable to display an image or video. The apparatus 50 may further comprise a keypad 34. In other embodiments of the invention any suitable data or user interface mechanism may be employed. For example the user interface may be implemented as a virtual keyboard or data entry system as part of a touch-sensitive display. The apparatus may comprise a microphone 36 or any suitable audio input which may be a digital or analogue signal input. The apparatus 50 may further comprise an audio output device which in embodiments of the invention may be any one of: an earpiece 38, speaker, or an analogue audio or digital audio output connection. The apparatus 50 may also comprise a battery 40 (or in other embodiments of the invention the device may be powered by any suitable mobile energy device such as solar cell, fuel cell or clockwork generator). The term battery discussed in connection with the embodiments may also be one of these mobile energy devices. Further, the apparatus 50 may comprise a combination of different kinds of energy devices, for example a rechargeable battery and a solar cell. The apparatus may further comprise an infrared port 41 for short range line of sight communication to other devices. In other embodiments the apparatus 50 may further comprise any suitable short range communication solution such as for example a Bluetooth wireless connection or a USB/FireWire wired connection.

The apparatus 50 may comprise a controller 56 or processor for controlling the apparatus 50. The controller 56 may be connected to memory 58 which in embodiments of the invention may store both data and/or may also store instructions for implementation on the controller 56. The controller 56 may further be connected to codec circuitry 54 suitable for carrying out coding and decoding of audio and/or video data or assisting in coding and decoding carried out by the controller 56.

The apparatus 50 may further comprise a card reader 48 and a smart card 46, for example a universal integrated circuit card (UICC) reader and a universal integrated circuit card for providing user information and being suitable for providing authentication information for authentication and authorization of the user at a network.

The apparatus 50 may comprise radio interface circuitry 52 connected to the controller and suitable for generating wireless communication signals for example for communication with a cellular communications network, a wireless communications system or a wireless local area network. The apparatus 50 may further comprise an antenna 60 connected to the radio interface circuitry 52 for transmitting radio frequency signals generated at the radio interface circuitry 52 to other apparatus(es) and for receiving radio frequency signals from other apparatus(es).

In some embodiments of the invention, the apparatus 50 comprises a camera 42 capable of recording or detecting imaging.

Figure 8:
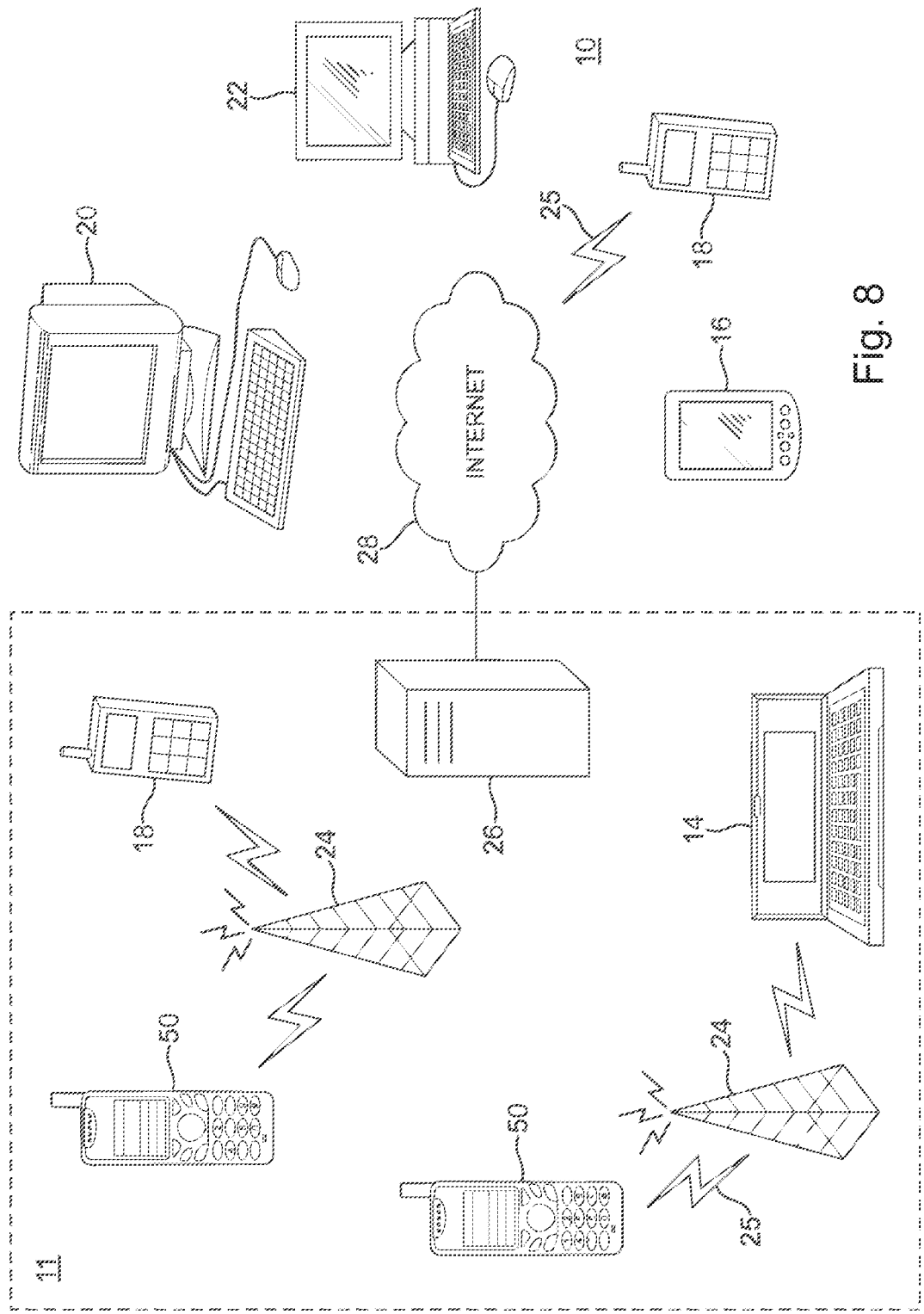
FIG. 8 shows an example of an arrangement for wireless communication comprising a plurality of apparatuses, networks and network elements.

With respect to FIG. 8, an example of a system within which embodiments of the present invention can be utilized is shown. The system 10 comprises multiple communication devices which can communicate through one or more networks. The system 10 may comprise any combination of wired and/or wireless networks including, but not limited to a wireless cellular telephone network (such as a global systems for mobile communications (GSM), universal mobile telecommunications system (UMTS), long term evolution (LTE) based network, code division multiple access (CDMA) network etc.), a wireless local area network (WLAN) such as defined by any of the IEEE 802.x standards, a Bluetooth personal area network, an Ethernet local area network, a token ring local area network, a wide area network, and the Internet.

For example, the system shown in FIG. 8 shows a mobile telephone network 11 and a representation of the internet 28. Connectivity to the internet 28 may include, but is not limited to, long range wireless connections, short range wireless connections, and various wired connections including, but not limited to, telephone lines, cable lines, power lines, and similar communication pathways.

The example communication devices shown in the system 10 may include, but are not limited to, an electronic device or apparatus 50, a combination of a personal digital assistant (PDA) and a mobile telephone 14, a PDA 16, an integrated messaging device (IMD) 18, a desktop computer 20, a notebook computer 22, a tablet computer. The apparatus 50 may be stationary or mobile when carried by an individual who is moving. The apparatus 50 may also be located in a mode of transport including, but not limited to, a car, a truck, a taxi, a bus, a train, a boat, an airplane, a bicycle, a motorcycle or any similar suitable mode of transport.

Some or further apparatus may send and receive calls and messages and communicate with service providers through a wireless connection 25 to a base station 24.

The base station 24 may be connected to a network server 26 that allows communication between the mobile telephone network 11 and the internet 28. The system may include additional communication devices and communication devices of various types.

The communication devices may communicate using various transmission technologies including, but not limited to, code division multiple access (CDMA), global systems for mobile communications (GSM), universal mobile telecommunications system (UMTS), time divisional multiple access (TDMA), frequency division multiple access (FDMA), transmission control protocol-internet protocol (TCP-IP), short messaging service (SMS), multimedia messaging service (MMS), email, instant messaging service (IMS), Bluetooth, IEEE 802.11, Long Term Evolution wireless communication technique (LTE) and any similar wireless communication technology. A communications device involved in implementing various embodiments of the present invention may communicate using various media including, but not limited to, radio, infrared, laser, cable connections, and any suitable connection.

Although the above examples describe embodiments of the invention operating within a wireless communication device, it would be appreciated that the invention as described above may be implemented as a part of any apparatus comprising a circuitry in which radio frequency signals are transmitted and received. Thus, for example, embodiments of the invention may be implemented in a mobile phone, in a base station, in a computer such as a desktop computer or a tablet computer comprising radio frequency communication means (e.g. wireless local area network, cellular radio, etc.).

In general, the various embodiments of the invention may be implemented in hardware or special purpose circuits or any combination thereof. While various aspects of the invention may be illustrated and described as block diagrams or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

In the following some examples will be provided.

According to a first example, there is provided a method comprising:

receiving a first video stream representing a left view of a part of a scene;

receiving a second video stream representing a right view of the part of the scene;

obtaining optical enhancement data regarding image pairs of the first video stream and the second video stream;

obtaining transform data for warping at least one of the left view and the right view; and warping the first video stream and the second video stream on the basis of the optical enhancement data and the transform data;

the warping comprising:

interpolating a first part of the left view on the basis of interpolation values of the transform data and the optical enhancement data;

extrapolating a second part of the left view on the basis of extrapolation values of the transform data and the optical enhancement data;

interpolating a first part of the right view on the basis of interpolation values of the transform data and the optical enhancement data;

extrapolating a second part of the right view on the basis of extrapolation values of the transform data and the optical enhancement data.

In some embodiments of the method the warping comprises:

interpolating a first part of the left view on the basis of interpolation values of the transform data and the optical enhancement data;

extrapolating a second part of the left view on the basis of interpolation values of the transform data and the optical enhancement data;

interpolating a first part of the right view on the basis of interpolation values of the transform data and the optical enhancement data;

extrapolating a second part of the right view on the basis of interpolation values of the transform data and the optical enhancement data.

In some embodiments of the method:

the first part of the left view is a left half of the left view;

the second part of the left view is a right half of the left view;

the first part of the left view is a right half of the right view;

the second part of the left view is a left half of the right view.

In some embodiments the method comprises: using larger warping near edges of the view than in a centre area of the view.

In some embodiments the method comprises:

interpolating pixel values of the first part of the left view towards image pixels of the right view; and interpolating pixel values of the first part of the right view towards image pixels of the left view.

In some embodiments the method comprises:

using transform data and optical enhancement data associated with a location of a pixel to define where that pixel should be moved in the view and how to fill the pixel values between the original location and the new location of the pixel. In some embodiments of the method the optical enhancement data comprises one or more of the following:

optical flow data;

extra pixels for obscured content;
additional panorama;
depth map data.

In some embodiments of the method first video stream and the second video stream represent one of the following projections:
360 degrees panorama;
cube mapping.

According to a second example, there is provided an apparatus comprising at least one processor; and at least one memory including computer program code the at least one memory and the computer program code configured to, with the at least one processor, cause the apparatus to perform at least the following:
receive a first video stream representing a left view of a part of a scene;
receive a second video stream representing a right view of the part of the scene;
obtain optical enhancement data regarding image pairs of the first video stream and the second video stream;
obtain transform data for warping at least one of the left view and the right view; and
warp the first video stream and the second video stream on the basis of the optical enhancement data and the transform data;
the apparatus further comprising computer program code configured to, with the at least one processor, cause the apparatus to perform the warping by:
interpolating a first part of the left view on the basis of interpolation values of the transform data and the optical enhancement data;
extrapolating a second part of the left view on the basis of extrapolation values of the transform data and the optical enhancement data;
interpolating a first part of the right view on the basis of interpolation values of the transform data and the optical enhancement data;
extrapolating a second part of the right view on the basis of extrapolation values of the transform data and the optical enhancement data.

In some embodiments the apparatus comprises computer program code configured to, with the at least one processor, cause the apparatus to perform the warping by:
interpolating a first part of the left view on the basis of interpolation values of the transform data and the optical enhancement data;
extrapolating a second part of the left view on the basis of interpolation values of the transform data and the optical enhancement data;
interpolating a first part of the right view on the basis of interpolation values of the transform data and the optical enhancement data;
extrapolating a second part of the right view on the basis of interpolation values of the transform data and the optical enhancement data.

In some embodiments of the apparatus:
the first part of the left view is a left half of the left view;
the second part of the left view is a right half of the left view;
the first part of the left view is a right half of the right view;
the second part of the left view is a left half of the right view.

In some embodiments the apparatus comprises computer program code configured to, with the at least one processor, cause the apparatus to:
use larger warping near edges of the view than in a centre area of the view.

In some embodiments the apparatus comprises computer program code configured to, with the at least one processor, cause the apparatus to:
interpolate pixel values of the first part of the left view towards image pixels of the right view; and
interpolate pixel values of the first part of the right view towards image pixels of the left view.

In some embodiments the apparatus comprises computer program code configured to, with the at least one processor, cause the apparatus to:
use transform data and optical enhancement data associated with a location of a pixel to define where that pixel should be moved in the view and how to fill the pixel values between the original location and the new location of the pixel.

In some embodiments of the apparatus the optical enhancement data comprises one or more of the following:
optical flow data;
extra pixels for obscured content;
additional panorama;
depth map data.

According to a third example, there is provided an apparatus comprising:
means for receiving a first video stream representing a left view of a part of a scene;
means for receiving a second video stream representing a right view of the part of the scene;
means for obtaining optical enhancement data regarding image pairs of the first video stream and the second video stream;
means for obtaining transform data for warping at least one of the left view and the right view; and
means for warping the first video stream and the second video stream on the basis of the optical enhancement data and the transform data;
the transform data comprising:
interpolation values for a first part of the left view;
extrapolation values for a second part of the left view;
interpolation values for a first part of the right view;
extrapolation values for a second part of the right view.

According to a fourth example, there is provided a computer readable storage medium stored with code thereon for use by an apparatus, which when executed by a processor, causes the apparatus to perform:
receive a first video stream representing a left view of a part of a scene;
receive a second video stream representing a right view of the part of the scene;
obtain optical enhancement data regarding image pairs of the first video stream and the second video stream;
obtain transform data for warping at least one of the left view and the right view; and
warp the first video stream and the second video stream on the basis of the optical enhancement data and the transform data;
the transform data comprising:
interpolation values for a first part of the left view;
extrapolation values for a second part of the left view;
interpolation values for a first part of the right view;
extrapolation values for a second part of the right view.

According to a fifth example, there is provided a method comprising:
receiving a first video stream representing a left view of a part of a scene;

receiving a second video stream representing a right view of the part of the scene;

using information regarding image pairs of the first video stream and the second video stream to form optical enhancement data; and forming transform data for warping at least one of the left view and the right view on the basis of at least the optical enhancement data;

the transform data comprising:
interpolation values for a first part of the left view;
extrapolation values for a second part of the left view;
interpolation values for a first part of the right view;
extrapolation values for a second part of the right view.

In some embodiments of the method the transform data comprises:
interpolation values for a first part of the left view;
extrapolation values for a second part of the left view;
interpolation values for a first part of the right view;
extrapolation values for a second part of the right view.

In some embodiments of the method the optical enhancement data comprises one or more of the following:
optical flow data;
extra pixels for obscured content;
additional panorama;
depth map data.

According to a sixth example, there is provided an apparatus comprising at least one processor and at least one memory including computer program code the at least one memory and the computer program code configured to, with the at least one processor, cause the apparatus to perform at least the following:

receive a first video stream representing a left view of a part of a scene;

receive a second video stream representing a right view of the part of the scene;

use information regarding image pairs of the first video stream and the second video stream to form optical enhancement data; and form transform data for warping at least one of the left view and the right view on the basis of at least the optical enhancement data;

the transform data comprising:
interpolation values for a first part of the left view;
extrapolation values for a second part of the left view;
interpolation values for a first part of the right view;
extrapolation values for a second part of the right view.

According to a seventh example, there is provided an apparatus comprising:

means for receiving a first video stream representing a left view of a part of a scene;

means for receiving a second video stream representing a right view of the part of the scene;

means for using information regarding image pairs of the first video stream and the second video stream to form optical enhancement data; and means for forming transform data for warping at least one of the left view and the right view on the basis of at least the optical enhancement data;

the transform data comprising:
interpolation values for a first part of the left view;
extrapolation values for a second part of the left view;
interpolation values for a first part of the right view;
extrapolation values for a second part of the right view.

According to an eight example, there is provided a computer readable storage medium stored with code thereon for use by an apparatus, which when executed by a processor, causes the apparatus to perform:

receive a first video stream representing a left view of a part of a scene;

receive a second video stream representing a right view of the part of the scene;

use information regarding image pairs of the first video stream and the second video stream to form optical enhancement data; and form transform data for warping at least one of the left view and the right view on the basis of at least the optical enhancement data;

the transform data comprising:
interpolation values for a first part of the left view;
extrapolation values for a second part of the left view;
interpolation values for a first part of the right view;
extrapolation values for a second part of the right view.

The invention claimed is:

1. A method comprising:
receiving a first video stream representing a left view of a part of a scene;
receiving a second video stream representing a right view of the part of the scene;
obtaining optical enhancement data regarding image pairs of the first video stream and the second video stream;
obtaining transform data for warping at least one of the left view or the right view; and
warping the first video stream and the second video stream on the basis of the optical enhancement data and the transform data;
wherein the warping comprises:
interpolating a first part of the left view on the basis of interpolation values of the transform data and the optical enhancement data;
extrapolating a second part of the left view on the basis of extrapolation values of the transform data and the optical enhancement data;
interpolating a first part of the right view on the basis of the interpolation values of the transform data and the optical enhancement data; and
extrapolating a second part of the right view on the basis of the extrapolation values of the transform data and the optical enhancement data.

2. The method according to claim 1, wherein:
the first part of the left view is a left half of the left view;
the second part of the left view is a right half of the left view;
the first part of the right view is a right half of the right view;
the second part of the right view is a left half of the right view.

3. The method according to claim 1, further comprising:
using larger warping near edges of the left view or the right view than in a centre area of the left view or the right view.

4. The method according to claim 1, wherein:
interpolating the first part of the left view comprises interpolating pixel values of the first part of the left view towards image pixels of the right view; and
interpolating the first part of the right view comprises interpolating pixel values of the first part of the right view towards image pixels of the left view.

5. The method according to claim 1, further comprising:
using transform data and optical enhancement data associated with a location of a pixel to define where the pixel should be moved in the left view or the right view and how to fill the pixel values between an original location and a new location of the pixel.

6. The method according to claim 1, wherein the optical enhancement data comprises one or more of the following:
   optical flow data;
   extra pixels for obscured content;
   additional panorama; and
   depth map data.

7. An apparatus comprising at least one processor; and at least one memory including computer program code the at least one memory and the computer program code configured to, with the at least one processor, cause the apparatus to perform at least the following:
   receive a first video stream representing a left view of a part of a scene;
   receive a second video stream representing a right view of the part of the scene;
   obtain optical enhancement data regarding image pairs of the first video stream and the second video stream;
   obtain transform data for warping at least one of the left view or the right view; and
   warp the first video stream and the second video stream on the basis of the optical enhancement data and the transform data;
   wherein the apparatus comprises computer program code configured to, with the at least one processor, cause the apparatus to perform the warping by:
   interpolating a first part of the left view on the basis of interpolation values of the transform data and the optical enhancement data;
   extrapolating a second part of the left view on the basis of extrapolation values of the transform data and the optical enhancement data;
   interpolating a first part of the right view on the basis of interpolation values of the transform data and the optical enhancement data; and
   extrapolating a second part of the right view on the basis of extrapolation values of the transform data and the optical enhancement data.

8. The apparatus according to claim 7, wherein:
   the first part of the left view is a left half of the left view;
   the second part of the left view is a right half of the left view;
   the first part of the right view is a right half of the right view; and
   the second part of the right view is a left half of the right view.

9. The apparatus according to claim 7, wherein the apparatus is further caused to perform:
   use larger warping near edges of the left view or right view than in a centre area of the left view or the right view.

10. The apparatus according to claim 7, wherein the apparatus is further caused to perform:
    interpolate the first part of the left view comprising interpolating pixel values of the first part of the left view towards image pixels of the right view; and
    interpolate the first part of the right view comprising interpolating pixel values of the first part of the right view towards image pixels of the left view.

11. The apparatus according to claim 7, wherein the apparatus is further caused to perform:
    use transform data and optical enhancement data associated with a location of a pixel to define where the pixel should be moved in the left view or the right view and how to fill the pixel values between an original location and a new location of the pixel.

12. The apparatus according to claim 7, wherein the optical enhancement data comprises one or more of the following:
    optical flow data;
    extra pixels for obscured content;
    additional panorama; and
    depth map data.

13. An apparatus comprising at least one processor; and at least one memory including computer program code the at least one memory and the computer program code configured to, with the at least one processor, cause the apparatus to perform at least the following:
    receive a first video stream representing a left view of a part of a scene;
    receive a second video stream representing a right view of the part of the scene;
    obtain optical enhancement data regarding image pairs of the first video stream and the second video stream;
    obtain transform data for warping at least one of the left view or the right view; and
    warp the first video stream and the second video stream on the basis of the optical enhancement data and the transform data;
    wherein the transform data comprises:
    interpolation values for a first part of the left view;
    extrapolation values for a second part of the left view;
    interpolation values for a first part of the right view; and
    extrapolation values for a second part of the right view.

14. The apparatus according to claim 13, wherein:
    the first part of the left view is a left half of the left view;
    the second part of the left view is a right half of the left view;
    the first part of the right view is a right half of the right view; and
    the second part of the right view is a left half of the right view.

15. The apparatus according to claim 13, wherein the apparatus is further caused to perform:
    use larger warping near edges of the left video stream or right video stream than in a centre area of the left video stream or the right video stream.

16. The apparatus according to claim 13, wherein the apparatus is further caused to perform:
    interpolate the first part of the left view comprising interpolating pixel values of the first part of the left view towards image pixels of the right view; and
    interpolate the first part of the right view comprising interpolating pixel values of the first part of the right view towards image pixels of the left view.

17. The apparatus according to claim 13, wherein the optical enhancement data comprises one or more of the following:
    optical flow data;
    extra pixels for obscured content;
    additional panorama; and
    depth map data.

18. A computer readable storage medium stored with code thereon for use by an apparatus, which when executed by a processor, causes the apparatus to perform:
    receive a first video stream representing a left view of a part of a scene;
    receive a second video stream representing a right view of the part of the scene;
    obtain optical enhancement data regarding image pairs of the first video stream and the second video stream;
    obtain transform data for warping at least one of the left view or the right view; and warp the first video stream and the second video stream on the basis of the optical enhancement data and the transform data;
wherein the transform data comprises:
interpolation values for a first part of the left view;
extrapolation values for a second part of the left view;
interpolation values for a first part of the right view; and
extrapolation values for a second part of the right view.

19. A method comprising:
receiving a first video stream representing a left view of a part of a scene;
receiving a second video stream representing a right view of the part of the scene;
using information regarding image pairs of the first video stream and the second video stream to form optical enhancement data; and
forming transform data for warping at least one of the left view or the right view on the basis of at least the optical enhancement data;
wherein in that the transform data comprises:
interpolation values for a first part of the left view;
extrapolation values for a second part of the left view;
interpolation values for a first part of the right view; and
extrapolation values for a second part of the right view.

20. A computer readable storage medium stored with code thereon for use by an apparatus, which when executed by a processor, causes the apparatus to perform:
receive a first video stream representing a left view of a part of a scene;
receive a second video stream representing a right view of the part of the scene;
use information regarding image pairs of the first video stream and the second video stream to form optical enhancement data; and
form transform data for warping at least one of the left view or the right view on the basis of at least the optical enhancement data;
wherein the transform data comprises:
interpolation values for a first part of the left view;
extrapolation values for a second part of the left view;
interpolation values for a first part of the right view; and
extrapolation values for a second part of the right view.

* * * * *